(12) United States Patent
Wang et al.

(10) Patent No.: US 9,338,395 B2
(45) Date of Patent: May 10, 2016

(54) VIDEO CONFERENCE SYSTEM AND DISPLAY ALLOCATION METHOD THEREOF

(71) Applicant: AVer Information Inc., New Taipei (TW)

(72) Inventors: Sheng-Feng Wang, New Taipei (TW); Fu-En Tsai, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 14 days.

(21) Appl. No.: 14/483,144

(22) Filed: Sep. 10, 2014

(65) Prior Publication Data

US 2015/0326821 A1 Nov. 12, 2015

(30) Foreign Application Priority Data

May 8, 2014 (TW) .............................. 103116413 A

(51) Int. Cl.
*H04N 7/15* (2006.01)
*H04N 7/14* (2006.01)

(52) U.S. Cl.
CPC . *H04N 7/142* (2013.01); *H04N 7/15* (2013.01)

(58) Field of Classification Search
CPC ............ H04N 7/15; H04N 7/152; H04N 7/14
USPC ........................................... 348/14.01–14.16
See application file for complete search history.

(56) References Cited

U.S. PATENT DOCUMENTS

| 2010/0280638 | A1* | 11/2010 | Matsuda | ................. | G06F 3/165 |
| | | | | | 700/94 |
| 2013/0169742 | A1* | 7/2013 | Wu | ........................ | H04N 7/157 |
| | | | | | 348/14.08 |
| 2015/0244981 | A1* | 8/2015 | Johnson | ................... | H04N 7/15 |
| | | | | | 348/14.07 |

FOREIGN PATENT DOCUMENTS

CN 102025970 A 4/2011

* cited by examiner

*Primary Examiner* — Melur Ramakrishnaiah
(74) *Attorney, Agent, or Firm* — CKC & Partners Co., Ltd.

(57) ABSTRACT

A display allocation method is disclosed herein. The display allocation method is applied to a display in a conference meeting and comprises the following steps: allocating a first, a second and a third image block on the display, in which sizes of the first and the second image block are larger than size of the third image block; detecting an effective sound of a first candidate video corresponding to the third image block to identify whether the first candidate video is effective; setting one of the first and the second image block as a primary image block, and setting another one of the first and the second image block as a secondary image block, in which the secondary image block includes a secondary video; and allocating the first candidate video and the secondary video to the secondary and the third image block respectively if the first candidate video is effective.

16 Claims, 6 Drawing Sheets

VIDEO CONFERENCE SYSTEM AND DISPLAY ALLOCATION METHOD THEREOF

RELATED APPLICATIONS

This application claims priority to Taiwanese Application Serial Number 103116413, filed May 8, 2014, which is herein incorporated by reference.

BACKGROUND

1. Field of Invention

The present disclosure relates to a video conference system. More particularly, the present disclosure relates to a video conference system with multiple participants and a display allocation method thereof.

2. Description of Related Art

Nowadays, companies set their operation offices at different locations and even different countries. Communication between the different offices of the same company or between different companies therefore becomes an increasing demand. With advances in networking and multimedia signal processing, video conference capable of two-way image and audio transmission gradually replaces audio-only conference call as a way to communicate between the offices.

In a video conference with multiple participants, a user (one of the participants) of the video conference see video frames corresponding to different participants. However, image sizes of the respective video frames are normally too small for the user to tell which of the participants in the videos is speaking, which makes the user even harder to follow the details of the video conference. On the other hand, if default setting is in a mode of one large video frame and multiple small video frames, the user can only manually switch the mode before the video conference starts to select a desired one in large video frame. Once the selection is done, it would be difficult for the user to know which participant is speaking in the small video frames, which makes the user not to clearly catch both of the video and audio information in the video conference.

Traditionally, voice detection function is adopted in the video conference so as to change the small video frame which is active into the large one. If there is only one participant speaking, this function is capable of allowing the user to clearly see the active video frame which the participant is speaking to precisely follow the information of the participant.

However, although the mentioned function allows the active video frames to changes size, the frequent size jumping of the video frames is annoying and uncomfortable to the user when the voice detection function detects different voices of different speaking participants from time to time. As such, the constantly size changing video frames may be not so helpful as expected and even achieve the opposite effect. Moreover, fast discussion between different speaking participants makes it impossible to simultaneously change the sizes of the video frames with the speaking participants. Therefore, the participants still have difficulty to follow the detailed discussion in the video conference.

As a result, in order to make the participants clearly understand the information of the video conference, a more efficient allocation of videos is needed.

SUMMARY

The disclosure provides a display allocation method applied to a display in a conference meeting. The display allocation method includes the following steps: allocating a first image block, a second image block and a third image block on the display, wherein sizes of the first image block and the second image block are larger than size of the third image block; detecting an effective sound of a first candidate video corresponding to the third image block so as to identify whether the first candidate video is effective; setting one of the first image block and the second image block as a primary image block, and setting another one of the first image block and the second image block as a secondary image block, in which the secondary image block includes a secondary video; and allocating the first candidate video to the secondary image block and allocating the secondary video to the third image block if the first candidate video is effective.

The disclosure provides a video conference system. The video conference system includes a display and a processing unit. The display includes a first image block, a second image block and a third image block, in which sizes of the first image block and the second image block are both greater than size of the third image block. The processing unit includes a detection module, a set module and an allocation module. The detection module is configured to detect a first candidate video of the third image block so as to identify whether the first candidate video has an effective sound. The set module is configured to set one of the first image block and the second image block as a primary image block, and to set another one of the first image block and the second image block as a secondary image block, in which the secondary image block includes a secondary video. The allocation module is configured to allocate the first candidate video to the secondary image block and to allocate the secondary video to the third image block when the first candidate video has the effective sound.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
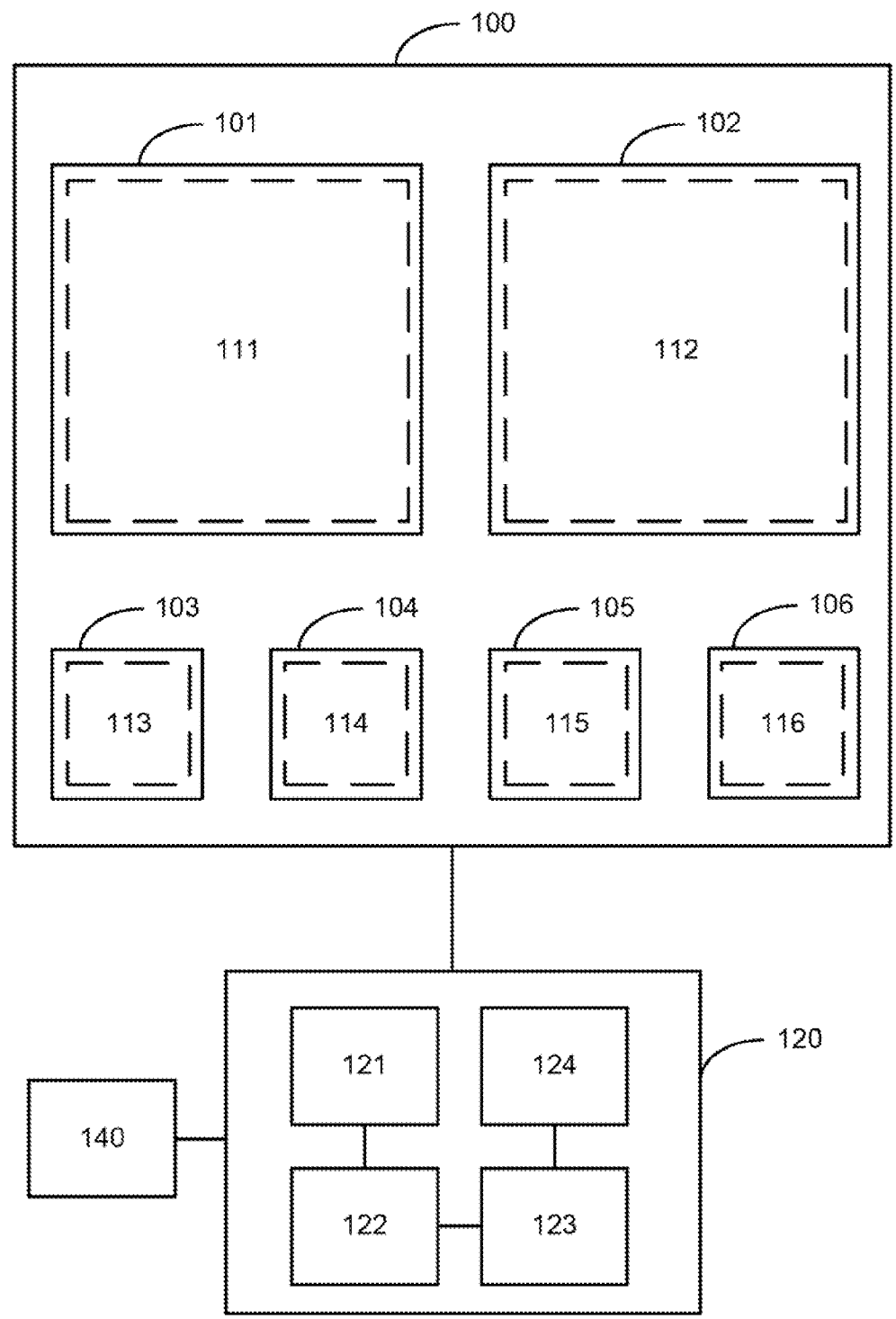
FIG. 1 is a schematic diagram illustrating a video conference system according to one embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Referring to FIG. 1, a schematic diagram of a video conference system 10 according to one embodiment of this disclosure is presented. The video conference system 10 includes a display 100, a processing unit 120 and a network unit 140.

The display 100 includes a first image block 101, a second image block 102, a third image block 103, a fourth image block 104, a fifth image block 105 and a sixth image block 106. The image blocks 101-106 includes videos 111-116 respectively, in which sizes of the first image block 101 and the second image block 102 are greater than sizes of the third image block 103, the fourth image block 104, the fifth image block 105 and the sixth image block 106.

In some embodiments, the size of the first image block 101 is the same as the size of the second image block 102.

The processing unit 120 includes a reception module 121, a detection module 122, a set module 123 and an allocation module 124. The reception module 121 is electrically coupled to the detection module 122. The detection module 122 is electrically coupled to the set module 123. The set module 123 is electrically coupled to the allocation module 124.

The reception module 121 receives selection commands from users so as to set the operating modes of the video conference system 10.

In some embodiments, the users can input the commands through a mouse, a keyboard, a touch screen, voice recognition, image recognition or video recognition.

The detection module 122 is configured to detect whether the videos 111-116 have effective sounds. In some embodiment, a frequency range of the effective sound is from 100 hz to 8000 hz. For example, if a first sound of one of the videos 111-116 is in the frequency range of the effective sound, the first sound is viewed as the effective sound, the a second sound of one of the videos 111-116 is out of the frequency range of the effective sound, the second sound is viewed as an ineffective sound.

In some embodiments, the detection module 122 further identifies whether waveforms of sounds from the videos 111-116 are waveforms corresponding to speech. If not, the detection module 122 filters sounds that do not correspond to waveforms of speech by corresponding filters, e.g., band-stop filter. For example, when sound of the video 111 includes a sound of the electric fan, since waveform of the sound of the electric fan has a impulse on a certain frequency and is not the waveform corresponding to the speech from human beings, the detection module 122 uses a certain filter, e.g., a bandstop filter corresponding to the certain frequency, to filter the sound of the electric fan corresponding to the certain frequency.

In some embodiments, the detection module 122 may filter out the sound that does not correspond to waveforms of speech before identifying whether the sound of the video includes the effective sound.

In some embodiments, the sound that does not correspond to waveforms of speech may be sounds of the electric fan, cough, or the sounds from other electric device.

In some embodiments, waveforms sound that does not correspond to waveforms of speech and the corresponding filters may be stored in a memory.

The set module 123 is configured to identify whether the videos 111-116 are effective according to whether time lengths of the effective sounds corresponding to the videos 111-116 are longer than a first specific time length. For example, the first specific time length may be 3 seconds. When the effective sound of the video 113 is greater than 3 seconds, video 113 is viewed as an effective video. The set module 123 is further configured to set one of the first image block 101 and the second image block 102 as a primary image block and to set another one of the first image block 101 and the second image block as the secondary image block. The video in the primary image block is the primary video, and the video in the secondary image block is the secondary video.

The allocation module 124 is configured to allocate videos 111-116 to the image block 101-106. When one of the videos 113-116 is effective (the one of the videos 113-116 is also called the effective video), the allocation module 124 allocates the effective video to the secondary image block and allocates the secondary video to the original image block corresponding to the effective video.

The network module 140 is configured to receive videos through a wireless network or a wireless network and to provide the videos to the processing unit 120.

Figure 2:
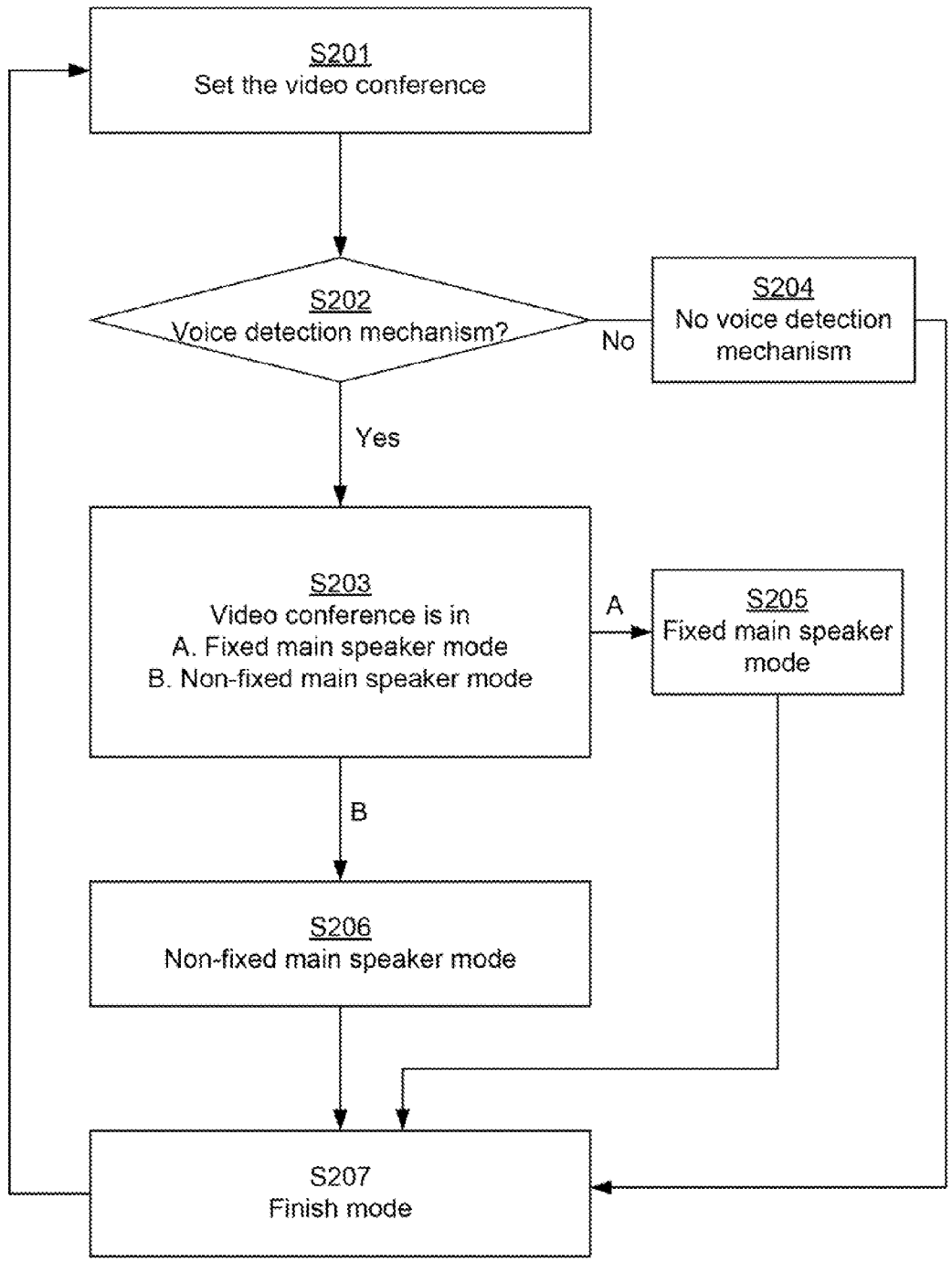
FIG. 2 is a flow diagram illustrating how to set a video conference according to one embodiment of this disclosure.

Referring to FIG. 2, a flow diagram of setting a video conference according to one embodiment of this disclosure is illustrated. In step S201, the user starts to set the video conference. In step S202, the user inputs the command so as to determine whether the video conference is in a voice detection mechanism. If yes, the process moves to step S203 so as to determine whether the video conference operates in a fixed main speaker mode or non-fixed main speaker mode. If not, the process moves to step S204 such that the video conference operates not in the voice detection mechanism, and the allocation of the videos 111-116 to the image blocks 101-106 is fixed on the display 100.

Moreover, in step S203, the user needs to input a selection command to let the process moves to step S205 or to step S206. In step S205, the video conference operates in a fixed main speaker mode, and in step S206, the step S206 operates in a non-fixed main speaker mode.

Figure 3:
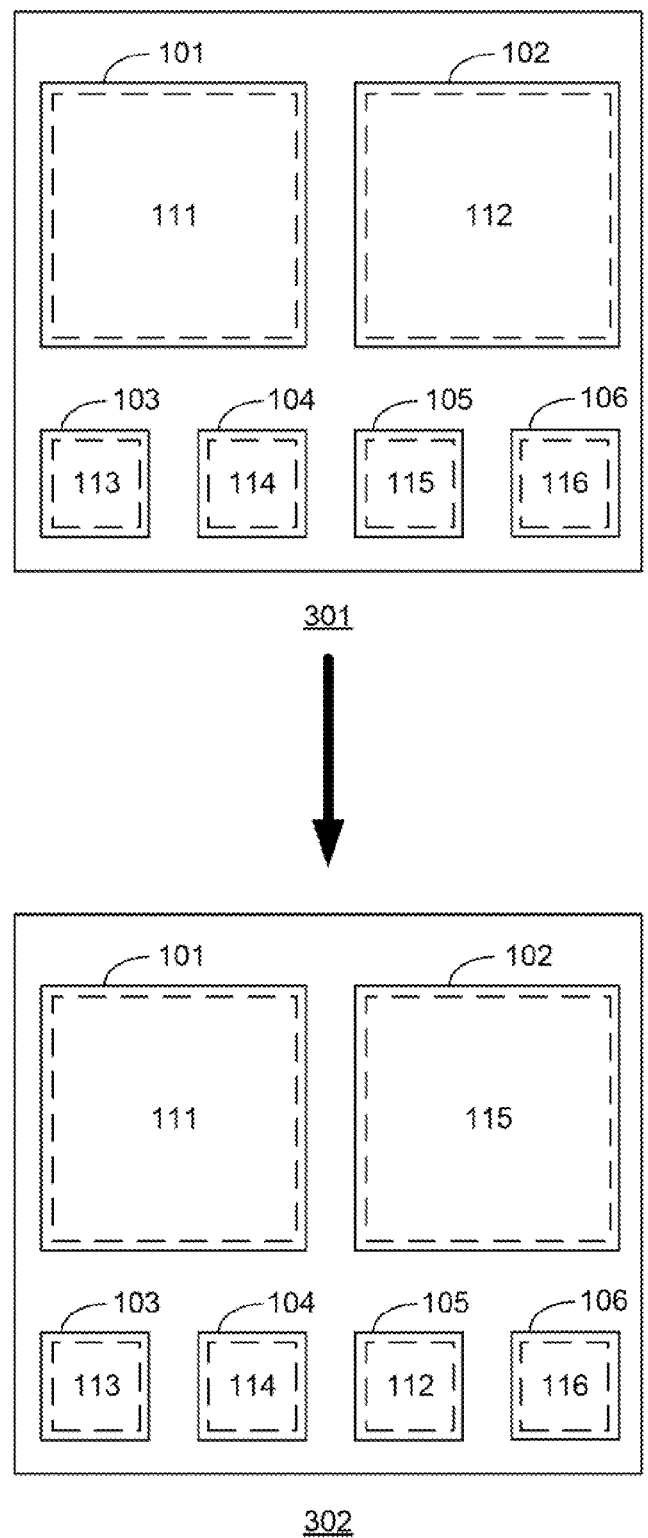
FIG. 3 is a schematic diagram illustrating switching of videos in a fixed main speaker mode according to one embodiment of this disclosure.

Reference is made to FIGS. 3-6 so as to illustrate the fixed main speaker mode and the non-fixed main speaker mode in more details. FIG. 3 is a schematic diagram which illustrates switching of videos in a fixed main speaker mode according to one embodiment of this disclosure. First, on time point 301, the display 100 has the allocation of the image blocks shown in FIG. 1, in which the video 111 of the first image block 101 is manually set as the fixed main speaker by the user. In more details, the set module 123 sets the first image block 101 and the video 111 as the primary image block and the primary video and set the second image block 102 and video 112 as the secondary image block and the secondary video. In the fixed main speaker mode, the primary stream 111 is fixed in the primary image block 101, and the secondary video 112 may be allocated to one of the other image blocks 102-106. For example, the allocation module 124 allocates the secondary video to the fifth image block 105 if the video 115 in the fifth image block is effective.

In some embodiments, when the video conference begins, the video 112 in the secondary image block 102 is the earliest video connected to the video conference system 10 other than the video of the main speaker.

Subsequently, the detection module 122 detects the videos 113-116 of the image blocks 103-106 so as to identify whether there is a speaker in the participants. In the present embodiment, the detection module 122 detects an effective sound of the video 115 in the fifth image block 105, and the said effective sound exceeds the first specific time length. Accordingly, the set module 123 identifies that the video 115 is effective. Since the set module 123 already set the primary image block (i.e., the first image block 101) and the secondary image block (i.e., the second image block 102) when the fixed main speaker mode begins, on the time point 302, the allocation module 124 allocates the video 115 to the secondary image block 102 and allocates the video 112 to the fifth image block 105 which originally corresponds to the video 115.

When the videos 112 and 115 finish in being allocated, the detection module 122 keeps detecting the effective sounds of videos 112-114 and 116, which makes the set module 123 identify whether the videos 112-114 and 116 are effective according to the times lengths of the effective sounds. If one of the videos 112-114 and 116 is effective, the allocation module 124 switches the one of the effective video (corresponding to the speaker) and the video which is in the second image block 102 into the place of the other. The step of switching can be executed continuously until the fixed main speaker mode is over.

In some embodiments, if the set module 123 identifies two or more videos to be effective at the same time, the allocation module 124 maintains the two or more videos in the originally corresponding image blocks. For example, if the vide 114 of the fourth image block 104 and the video 115 of the fifth image block 105 are identified to be effective at the same time, the allocation module 124 maintains the video 115 and the video 116 in the original fourth image block 104 and the fifth image block 105.

Figure 4:
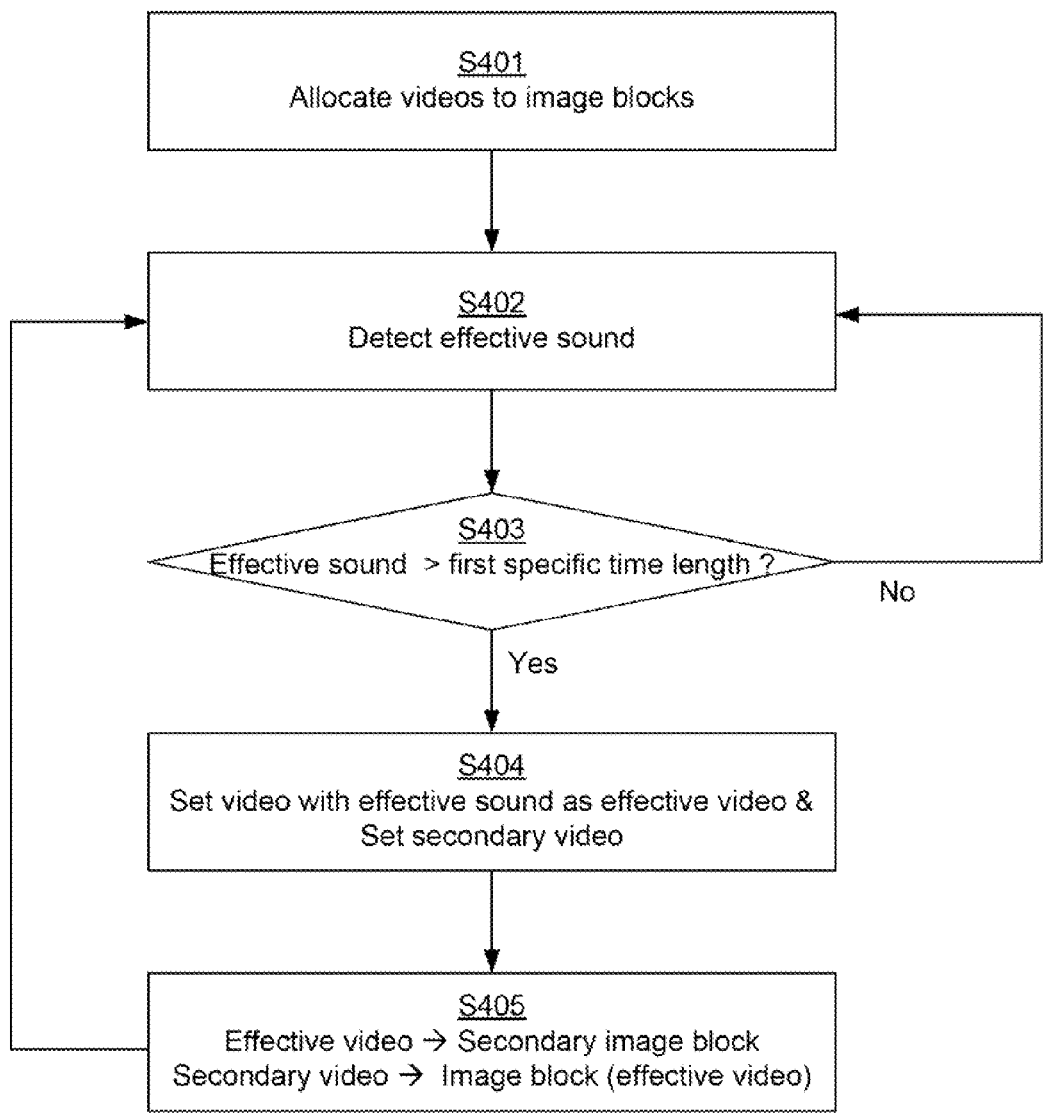
FIG. 4 is a flow diagram illustrating a fixed main speaker mode according to one embodiment of this disclosure.

FIG. 4 is a flow diagram illustrating a fixed main speaker mode according to one embodiment of this disclosure. First, in step S404, the allocation module 124 allocates the video of the main speaker and the video which is first connected to the video conference system other than the video of the main speaker to the first image block 101 (the primary image block) and the second image block 102 (the secondary image block) respectively, and the allocation module 124 allocates the other videos to the remaining image blocks. In step S402, the detection module 122 detects the effective sounds of all the videos 111-116.

In step S403, when an effective sound of the video corresponding to one of the image blocks 103-106 lasts longer than a first specific time, the set module 123 sets the video corresponding to one of the image blocks 103-106 as the effective video in step S404. In step S405, the allocation module 124 allocates the effective video to the second image block 102 and allocates the video which is originally in the second image block 102 to the image block corresponding to effective video. When the allocation is finished, the detection module 122 keeps detecting the effective sounds of the image blocks 103-106.

When none of the effective sounds of videos corresponding to the image blocks 103-106 lasts longer than the first specific time length in step S403, the process moves to step S402 such that the detection module 122 keeps detecting the effective sounds of image blocks 103-106.

Figure 5:
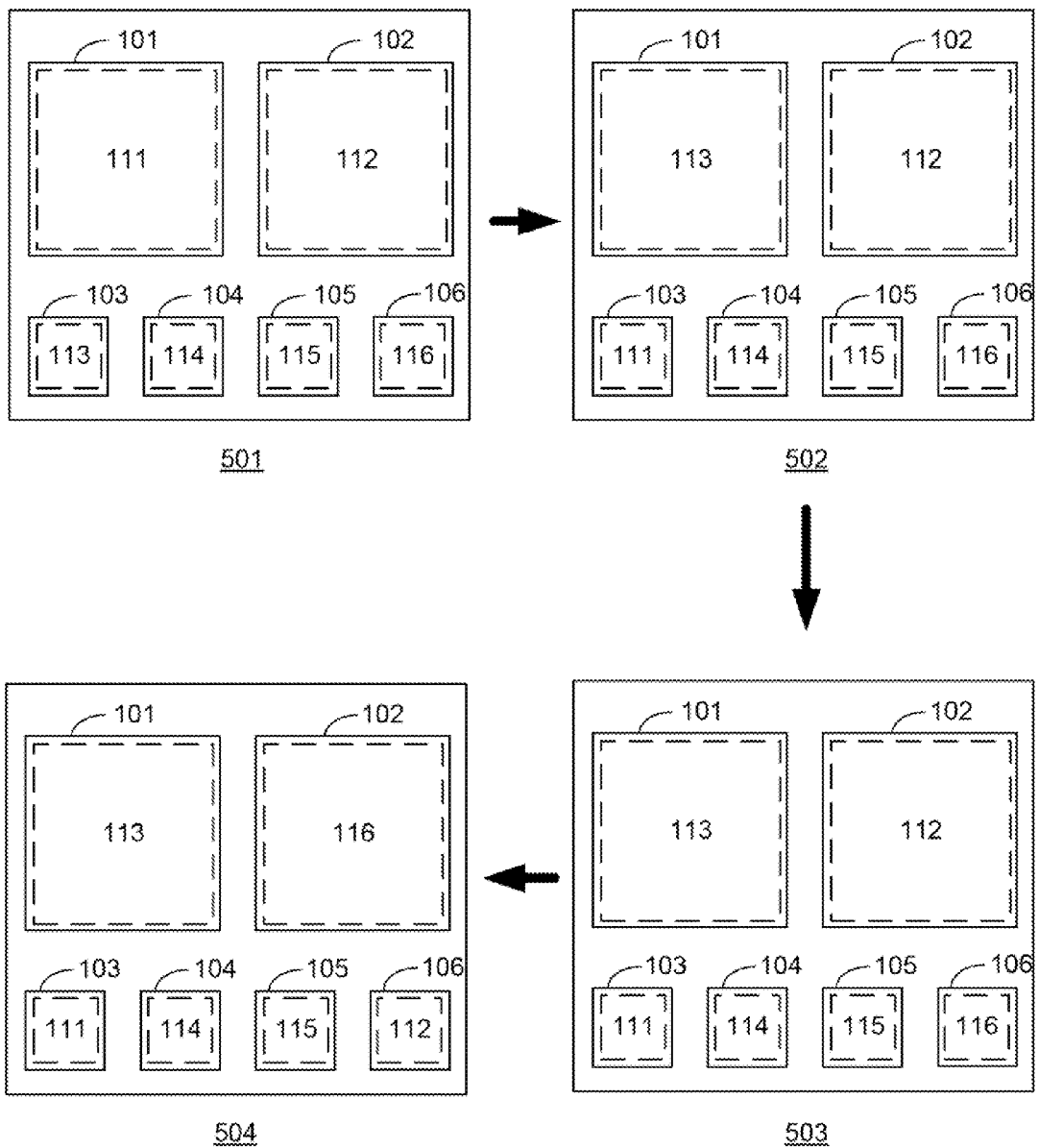
FIG. 5 is a schematic diagram illustrating switching of videos in a non-fixed main speaker mode according to one embodiment of this disclosure.

On the other hand, reference is made to FIG. 5 in order to illustrate the non-fixed main speaker mode. FIG. 5 is a schematic diagram which illustrates switching of videos in a non-fixed main speaker mode according to one embodiment of this disclosure. First, the allocation of the image blocks on the display 100 is the same as the allocation in FIG. 1. On a time point 501, the detection module 122 detects effective sounds of all the videos 111-116 corresponding to image blocks 101-106. In more details, the detection module 122 detects the videos 113-116 corresponding to the image blocks 103-106 with the smaller size such that the set module 123 can identify whether the effective sounds of the videos 113-116 last longer than the first specific time length and determine whether the videos 113-116 are effective.

Subsequently, the set module 123 sets one of the first image block 101 and the second image block 102 as the primary image block. In more details, the set module 123 identify which of the videos 111-112 has a primary effective sound such that the set module 123 set the video and the image block corresponding to the primary effective sound as the primary video and the primary image block, in which the primary effective sound is the closest to the a time point when effective video is identified to be effective. The primary effective sound is also in the frequency range of the voice corresponding to the human being.

In addition, the set module 123 further identifies whether the time length of the primary effective sound lasts longer than a second specific time length. If yes, the video and the image block corresponding to the primary effective sound are set as the primary video and the primary image block respectively. On the other hand, if the time length of the primary effective sound does lasts no longer than the second specific time length, the set module 123 counts time lengths of the effective sounds corresponding to the videos of the first image block 101 and the second image block 102 in a time interval, in which the time interval is a third time length, e.g., 3 seconds, before the said time point. If the effective sound corresponding to one of the videos has a longer time length, the set module 123 sets the one of the video and the corresponding image block as the primary video and the primary image block respectively.

On time point 501, since the video 112 of the second image block 102 has the primary effective sound lasting longer than the second specific time length, the set module 123 sets the video 112 and the second image block 102 as the primary video and the primary image block respectively and sets the video 111 and the first image block 101 as the secondary video and the secondary image block. Later, the allocation module 124 allocates the effective video 113 to the first image block 101 (secondary image block) and allocates the video 111 to the third image block 103.

On time point 502, since the detection module 122 detects the effective sounds in the video 114 and the video 115 at the same time, the set module 123 and the allocation module 124 do not execute any operation. For example, when participants of the video 114 and of the video 115 are arguing on a certain issue, the set module 123 do not set any video and image block as the primary video and primary image block in order to make sure that the videos are not frequently moved on the display. Accordingly, the allocation module 124 would not further switch the videos of different image blocks.

On time point 503, the detection module 122 detects that the video 116 has the effective sound, and the set module 123 identifies that the video 116 is the effective video and that the video 112 has the primary effective sound. However, the primary effective sound does not last longer than the second specific time length. Therefore, the set module 123 counts the effective sounds of the video 112 and the video 113 in a time interval respectively, in which the said time interval is the third specific time length before the time point when the video 116 is identified having the effective sound. In the present embodiment, since the effective sound of the video has a longer time length, the set module 123 sets the first image block 101 and the video 113 as the primary image block and the primary video. The allocation module 123 allocates the video 116 to the second image block 102 and allocates the video 112 to the sixth image block 106.

Figure 6:
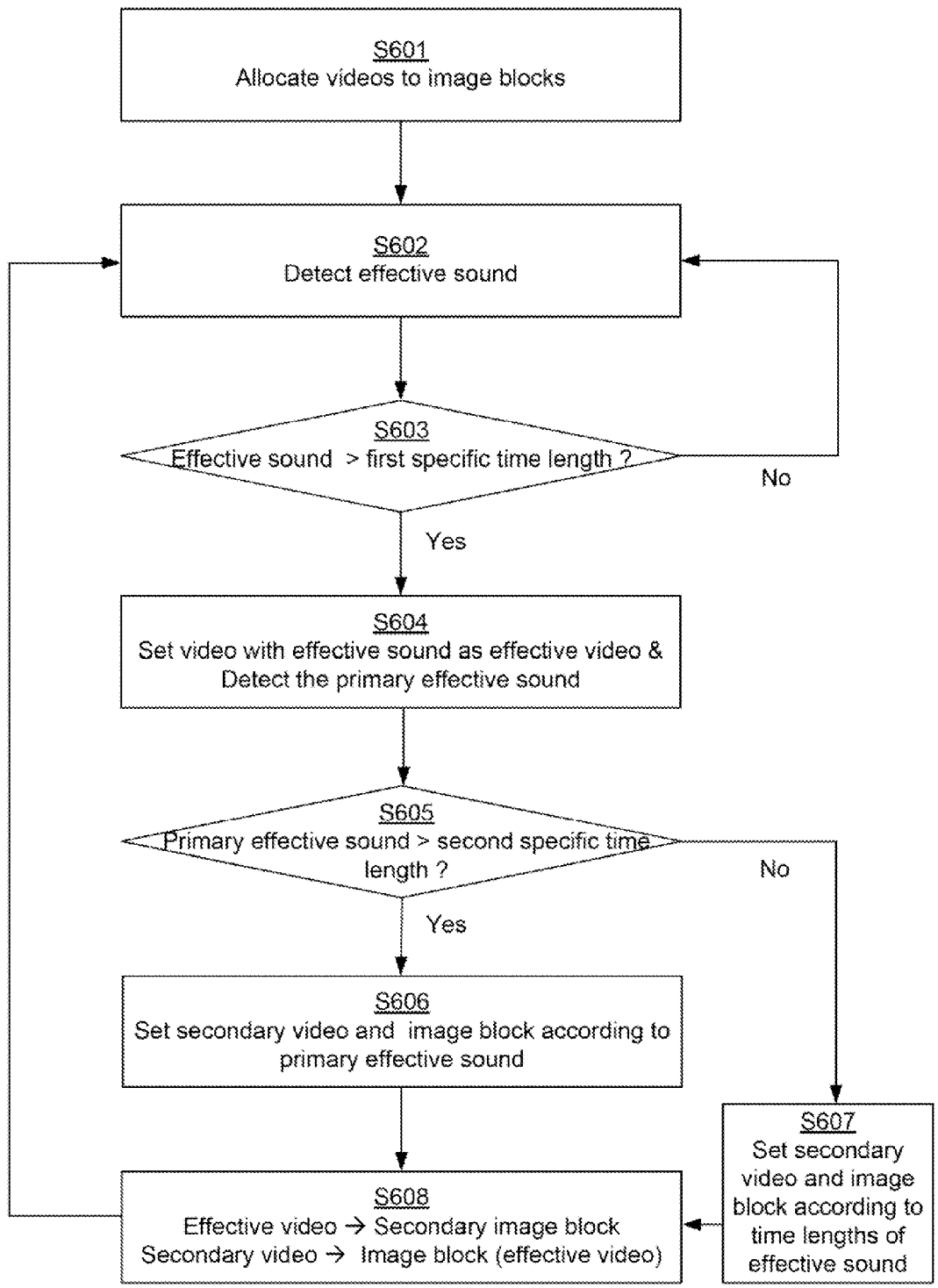
FIG. 6 is a flow diagram illustrating a non-fixed main speaker mode according to one embodiment of this disclosure.

Reference is also made to FIG. 6, a flow diagram of a non-fixed main speaker mode according to one embodiment of this disclosure is illustrated. First, in step S601, the allocation module 124 allocates the first and the second connected videos to the first image block 101 and the second image block 102, and the allocation module 124 also allocates the later connected videos to the rest of image blocks. In step S602, the detection module 122 detects the effective sounds of the videos 111-116. When none of the effective sounds lasts longer than the first specific time length in step S603, the detection module 122 keeps detecting all of the videos in step S602.

When an effective sound of the video corresponding to one of the image blocks 103-106 lasts longer than the first specific time length in step S603, the set module 123 sets the said video as the effective video (i.e., video of the speaker) and temporarily sets the video corresponding to one of the first image block 101 and the second image block 102 as the primary video in step S604, in which the said video has the primary effective sound.

Hereafter, in step S605, the set module 123 identifies whether the primary effective sound lasts longer than the second specific time length. If yes, the set module 123 sets the video and the image block corresponding to the primary effective sound and the primary image block and sets the other as the secondary video and the secondary image block in step S606.

If the primary effective sound lasts no longer than the first specific time length, the process moves to step S607. In step S607, the set module 123 counts time lengths of the effective sounds corresponding to the videos of first image block 101 and the second image block 102 in a time interval, in which the time interval is the third specific time length before the time point when the effective video is identified being effective. Subsequently, the set module 12 sets the video and image block corresponding to the effective sound with a longer time length as the primary video and the primary image block and sets the other video and image block as the secondary video and the secondary image block.

In step S608, the allocation module 123 allocates the effective video to the secondary image block and allocates the secondary video to the image block which originally corresponds to effective video. After the allocation is finished, the detection module 122 keeps detecting the effective sounds of the videos 111-116 in step S602.

Referring back to FIG. 2, the user may input command to finish the mode in which the video conference operates in step S207. When the mode is finished, the user can reset the mode of the video conference in step S201. Therefore, the user can effectively switch to different modes when the video conference is in progress, which makes the present disclosure be implemented with more flexibility.

In all of the embodiments mentioned above, the processing unit may be a central processing unit (CPU), a control unit, a micro processor or other hardware components capable of executing commands, in which each module of the processing unit may be implemented as programming codes. The programming codes may be stored in a storage device. Accordingly, the processing unit may access and execute the programming codes stored in the storage device so as provide the functions corresponding to the modules.

According to the embodiments mentioned above, the video conference of the present disclosure can reduce the possibility of frequently moving videos, and thus the quality of the video conference is largely improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display allocation method applied to a display in a conference meeting, comprising:

allocating a first image block, a second image block and a third image block on the display, wherein sizes of the first image block and the second image block are larger than size of the third image block;

detecting an effective sound of a first candidate video corresponding to the third image block to identify whether the first candidate video is effective;

setting one of the first image block and the second image block as a primary image block, and setting another one of the first image block and the second image block as a secondary image block, in which the secondary image block includes a secondary video; and allocating the first candidate video to the secondary image block and allocating the secondary video to the third image block if the first candidate video is effective.

2. The display allocation method of claim 1, wherein the step of identifying whether the first candidate video is effective further comprises:

identifying whether the effective sound lasts longer than a first specific time length.

3. The display allocation method of claim 1, wherein when the display allocation method operates in a first mode, the display allocation method further comprises:

setting one of the first image block and the second image block as the primary image block according to a user input.

4. The display allocation method of claim 1, wherein the secondary video is the earliest video connected to the conference meeting other than a primary video of the primary image block.

5. The display allocation method of claim 1, when the display allocation method operates in a second mode, further comprising:

identifying which of a first video of the first image block and a second video of the second image block has a primary effective sound, wherein the primary effective sound is the closest to a time point when the first candidate video is identified to be effective; and identifying whether the primary effective sound lasts more than a second specific time length, if the primary effective sound lasts more than the second specific time length, setting the image block corresponding to the primary effective sound as the primary image block, and setting the other image block as the secondary image block.

6. The display allocation method of claim 5, wherein the step of setting the primary image block and the secondary image block further comprises:

counting time lengths of effective sounds corresponding to the first video and the second video respectively within a specific time length before the time point if the primary effective sound does lasts no longer than the second specific time length;

setting the image block corresponding to the effective sound with the longer time length as the primary image block, and setting the other image block as the second primary image block.

7. The display allocation method of claim 1, further comprising:

setting a fourth image block on the display, wherein size of the fourth image block is the same as the size of the third image block;

detecting a second candidate video of the fourth image block so as to identify whether the second candidate video includes the effective sound; and maintaining the first candidate video in the third image block and maintaining the second candidate video in the fourth image block if the first candidate video of the third image block and the second candidate video of the fourth image block both have the effective sound.

8. The display allocation method of claim 1, wherein a frequency range of the effective sound is from 100 hz to 800 hz.

9. A video conference system, comprising:

a display, the display comprising a first image block, a second image block and a third image block, wherein sizes of the first image block and the second image block are both greater than size of the third image block; and a processing unit, comprising:

a detection module, configured to detect a first candidate video of the third image block so as to identify whether the first candidate video has an effective sound;

a set module, configured to set one of the first image block and the second image block as a primary image block and to set another one of the first image block and the second image block as a secondary image block, wherein the secondary image block includes a secondary video; and an allocation module, configured to allocate the first candidate video to the secondary image block and to allocate the secondary video to the third image block when the first candidate video has the effective sound.

10. The video conference system of claim 9, wherein the detection module is further configured to identify whether the effective sound lasts longer than a first specific time length.

11. The video conference system of claim 9, wherein the processing unit further comprises a reception module, wherein the reception module is configured to receive a selection command from a user, and the set module is further configured to set one of the first image block and the second image block as the primary image block when the selection command corresponds to selecting a first mode.

12. The video conference system of claim 9, wherein the secondary video is the earliest video connected to the conference meeting other than a primary video of the primary image block.

13. The video conference system of claim 9, wherein the processing unit further comprises a reception module, the reception module is configured to receive a selection command of a user, and the set module is further configured to identify which of a first video of the first image block and a second video of the second image block has a primary effective sound when the selection command corresponds to selecting a second mode, wherein the primary effective sound is the closest from a time point when the first candidate video is identified to be effective; and the set module is further configured to identify whether the primary effective sound lasts more than a second specific time length, and the set module set the image block corresponding to the primary effective sound as the primary image block and set the other image block as the secondary image block if the primary effective sound lasts more than the second specific time length.

14. The video conference system of claim 13, wherein the set module counts time lengths of effective sounds corresponding to the first video and the second video respectively within a third specific time length before the time point if the primary effective sound does lasts no longer than the second specific time length, and the set module sets the image block corresponding to the effective sound with a longer time length as the primary image block, and setting the other image block as the second primary image block.

15. The video conference system of claim 9, wherein the display further comprises a fourth image block, the detection module further detects a second candidate video of the fourth image block so as to identify whether the second candidate video includes the effective sound, and the set module is configured to maintain the first candidate video in the third image block and to maintain the second candidate video in the fourth image block if the first candidate video of the third image block and the second candidate video of the fourth image block both have the effective sounds.

16. The video conference system of claim 9, wherein a frequency range of the effective sound is from 100 hz to 800 hz.

* * * * *